United States Patent [19]
Viano et al.

[11] Patent Number: 5,823,627
[45] Date of Patent: Oct. 20, 1998

[54] VEHICLE SEAT WITH INTEGRAL, LOAD LIMITING BELT SYSTEM

[75] Inventors: David Charles Viano, Bloomfield Hills; James Peter Nini, Clinton Township, Macomb County; Richard Jon Neely, Casco, all of Mich.; Hans Gert Nilson, Wuppertal, Germany

[73] Assignees: General Motors Corporation, Detroit, Mich.; Delphi Automotive Systems Deutschland GmbH, Wuppertal, Germany

[21] Appl. No.: 835,929

[22] Filed: Apr. 11, 1997

[51] Int. Cl.⁶ .................................................. B60R 22/28
[52] U.S. Cl. .................... 297/471; 297/216.13; 297/480; 297/483; 280/808; 280/805
[58] Field of Search ........................ 297/216.13, 216.14, 297/470, 471, 483, 484, 479, 478, 480; 280/805, 808

[56] References Cited

U.S. PATENT DOCUMENTS

| | | | |
|---|---|---|---|
| 4,889,389 | 12/1989 | White | 297/468 |
| 5,020,856 | 6/1991 | George | 297/483 |
| 5,253,924 | 10/1993 | Glance . | |
| 5,318,341 | 6/1994 | Griswold et al. | 297/362.11 |
| 5,431,448 | 7/1995 | Ball et al. | 280/808 |
| 5,447,360 | 9/1995 | Hewko et al. | 297/452.18 |
| 5,468,053 | 11/1995 | Thompson et al. | 297/472 |
| 5,547,259 | 8/1996 | Frederick | 297/452.18 |

*Primary Examiner*—Peter M. Cuomo
*Assistant Examiner*—Anthony D. Barfield
*Attorney, Agent, or Firm*—Patrick M. Griffin

[57] ABSTRACT

A vehicle seat (10) has a lower seat frame (14) and a seat back (16) pivoted about a recliner axis (20). An occupant (22) restraining shoulder belt (26) has an upper attachment point provided by a sliding belt guide (40) fixed to the top of a resilient, flexible elongated tower (36) attached to one side of the seat back (16). The tower (36) is normally unflexed, with the same orientation as the seat back (16), but is capable of bending with the belt guide (40) down and forwardly relative to the seat back and closer to the recliner axis (20) when a forward and downward force is applied to the belt guide (40). An inertially locking belt retractor (24) is rigidly fixed to the seat (10) below the belt guide (40). The retractor (24) provides a reserve length of belt (50) that extends up along the back of the tower (36) and over the belt guide (40) and then continues into the shoulder belt (26). In the event of rapid vehicle deceleration, the belt retractor (24) locks to the belt reserve length (50) as the occupant (22) moves relatively forward into the shoulder belt (26), thereby rapidly increasing tension in the shoulder belt (26) and applying a forward and downward bending force to the upper belt guide (40) and tower (36). In response, the tower (36) bends over and downwardly, allowing the belt reserve length (50) to move more horizontally along with the bending tower (36) as the upper guide (40) and shoulder belt (26) move forwardly with the occupant. This compound belt motion reduces the resulting tension load in the shoulder belt (26) considerably, as well as the moment applied to the seat back (16) about the recliner axis (20).

4 Claims, 4 Drawing Sheets

VEHICLE SEAT WITH INTEGRAL, LOAD LIMITING BELT SYSTEM

TECHNICAL FIELD

This invention relates to vehicle seats in general, and specifically to a vehicle seat with an integral, "all belts to seat" system.

BACKGROUND OF THE INVENTION

Vehicle occupant restraints, especially those directed to front seat driver and passenger, have progressed rapidly from a lap belt only design to a so called "3 point" design, with both a lap belt and a shoulder belt running diagonally across the occupant from an upper attachment point above and slightly behind one shoulder to a diagonally opposed lower point. The other of the three points is simply the other point of attachment for the lap belt. With conventional three point belt systems, the various points of attachment have typically been secured to the vehicle body or floor. The upper point of the shoulder belt, for example, has usually been provided by a "D ring" fixed to the pillar of the vehicle body. To provide the shoulder belt, a length of belt pays out from a retractor, up and through the D ring, and then across the shoulder and chest of the occupant to the lower attachment point (buckle). The retractor pays out belt under a slight tension as it is being adjusted and secured by the occupant, providing comfort and a snug fit. The retractor is also typically an inertially latching design, however, meaning that in the event of vehicle and occupant deceleration caused by a frontal impact, the retractor locks fast, letting out only a small, predetermined length of belt webbing. Thus, the occupants forward motion relative to the vehicle is restrained by the belt, and the tension load in the belt rises very rapidly. That belt load is conventionally resisted by vehicle body frame anchoring points, which are fixed relative to the vehicle by definition.

Alternatively, a belt system integrated entirely into the seat structure would move with the seat as the seat moved relative to the vehicle body frame, and provide design flexibility. However, the seat frame structure must then be strong enough itself to resist the heavy belt loads transferred to it through belt attachment points that are now secured to the seat frame. The seat back also generally pivots about an axis relative to the lower part of the seat frame, so that a recliner mechanism can adjust the angle of the seat back. During frontal impact, when the increased belt load is transferred to the seat back at the high attachment point, a large moment arm exists relative to the seat back pivot axis, as well as a moment tending to rotate the lower frame up from its attachment to the vehicle body floor. All of these forces and moments must be resisted by the seat frame in an all belts to seat design. Most of the existing patents in this area are directed to various seat frame designs intended to have enough strength and stiffness to resist the belt loads. A good example is U.S. Pat. No. 5,318,341 issues Jun. 7, 1994 to Griswold et al. Extra seat strength, whether it is supplied by extra component thickness, bracing, supports or reinforcement, will generally involve extra seat weight and expense.

A slightly different approach is taken in U.S. Pat. No. 5,468,053 issued Nov. 21, 1995 to Thompson, et al., although not in the context exclusively of seat belts that are fully integral to the seat. The portion of the seat frame to which the belt retractor is secured is designed to deform. For example, a horizontal cross beam of the seat frame has the belt retractor attached to it, at a point approximately in the center of the seat back and beam. The belt runs out of the retractor, over a sliding belt guide at the top of the seat back (providing the upper point of belt attachment) and then diagonally down across the shoulder and chest of the occupant. The cross beam is designed to yield elastically under lower belt loads, and deform permanently under higher belt loads, thereby absorbing energy and reducing the load in the belt. In effect, the belt is allowed to "stretch" slightly, despite the locking retractor. The deforming beam is described as being securable to the vehicle body as well as the seat frame, so the invention is not exclusively applicable to an all belts to seat type of seat design.

Several drawbacks and shortcomings are presented by the deforming beam design of U.S. Pat. No. 5,468,053. Most fundamentally, if an occupant is to be restrained during a vehicle deceleration, a certain amount of energy must be dissipated by the occupant. This is achieved only by the belt putting a restraining force on the occupant, experienced by the belt as an increased tension load resisted through a distance proportional to the distance that the restrained occupant moves relative to the vehicle. Only by increasing the distance that the belt travels during the occupant restraining event may the force and tension load in the belt be reduced. In the U.S. Pat. No. 5,468,053 design, the increase in belt travel is achieved only by virtue of deformation Of the particular beam to which the belt locking retractor is directly mounted, be it a seat mounted or floor mounted beam. The sequence of events would be vehicle deceleration, followed by nearly simultaneous forward motion of the occupant into the belt and lockup of the belt retractor. The resultant increased tension load created in the locked up belt by the restrained, forward moving occupant would then pull the retractor mounting beam up. The beam flexure thereby creates extra belt motion that would not be allowed by a solidly mounted, locked retractor. Increased belt travel, as noted, allows an equal amount of energy to be dissipated (during restraint of the relatively forwardly moving occupant) with proportionately less load on the belt and occupant. However, as disclosed in the patent, every inch of extra belt travel is attained only by an equal, matching motion of the retractor. And retractor motion is achieved only by upward buckling of a seat cross beam that is restrained at both ends, or, alternatively, by upward bending or tearing of the free end of a beam restrained at only one end. In either case, the retractor mounting portion of the beam must move one to one with the retractor for every inch of extra belt travel provided. It would not take a great deal of belt travel to cause permanent deformation of the beam under those circumstances. This would potentially require replacement of the entire seat frame, or, at least, a dismantling of a portion of the seat to see whether the beam in fact had been permanently deformed.

SUMMARY OF THE INVENTION

A vehicle seat with an integral, load limiting belt system in accordance with the present invention is characterized by the features specified in claim 1.

In the preferred embodiment disclosed, a seat back frame is pivoted to a vehicle floor mounted seat frame by a conventional pivoting seat back recliner. An inertially locking belt retractor is fixed to the seat back frame, rigidly and securely, directly below the upper attachment point of the shoulder belt. A resilient, flexible tower runs along the side of the seat back frame, in a normal, unflexed condition, with its length axis at substantially the same nearly vertical orientation as the seat back. The tower is preferably constructed of a central metal spring with a surrounding overmold of elastomeric material, and the lower end of the tower is retained securely to the seat frame, restrained against flexing, while the upper end and a portion of the upper length of the tower is free to flex substantially only in a forward, downward, and sideways inboard direction. A sliding belt guide is fixed to the upper end of the tower, just above and behind the outward shoulder of an occupant, and constitutes the upper attachment point of the shoulder belt. The belt runs out of the retractor, upwardly along the back of the tower, over the belt guide and then diagonally down across the shoulder and chest of the seated occupant to the lower attachment point of the shoulder belt, a conventional buckle.

During a rapid deceleration of the vehicle, the occupant moves forwardly relative to the vehicle as the belt retractor locks. As a consequence, the occupant presses against the locked up shoulder belt, putting the belt in increased tension. A force with a forward and downward component is applied by the tensioned belt to the sliding guide at the upper end of the flexible tower. Since the upper end of the tower is a free sliding guide, the guide can slide under the belt, allowing the tower to bend forwardly and down in response to the increased belt load. Since the locked belt runs up and over a free sliding guide, the tower, by bending forward, reduces the increase in tension belt load that would otherwise occur. The belt is effectively lengthened by nearly double the extent to which the tower shortens along its axis as it bends, and the occupant is allowed to bend forward at the waist farther, while still being restrained by the shoulder belt. Not only is the force applied by the belt to the belt guide reduced, the moment arm through which that reduced force acts on the recliner pivot axis is shortened. Furthermore, as the tower bends, the upper shoulder belt attachment point is effectively allowed to move with the forward bending seat occupant, self adjusting to remain at substantially the same position relative to the shoulder of the occupant. The moment applied to the seat back and the recliner mechanism is lowered both by virtue of the lower belt load per se, and the shorter moment arm through which it acts. When the limit of tower bending is reached, and the occupant rebounds, the slack is taken up out of the belt, and the tower returns to it's unfixed position.

BRIEF DESCRIPTION OF THE DRAWINGS

The present invention will now be described, by way of example, with reference the accompanying drawings, in which.

DESCRIPTION OF THE PREFERRED EMBODIMENT

Figure 1:
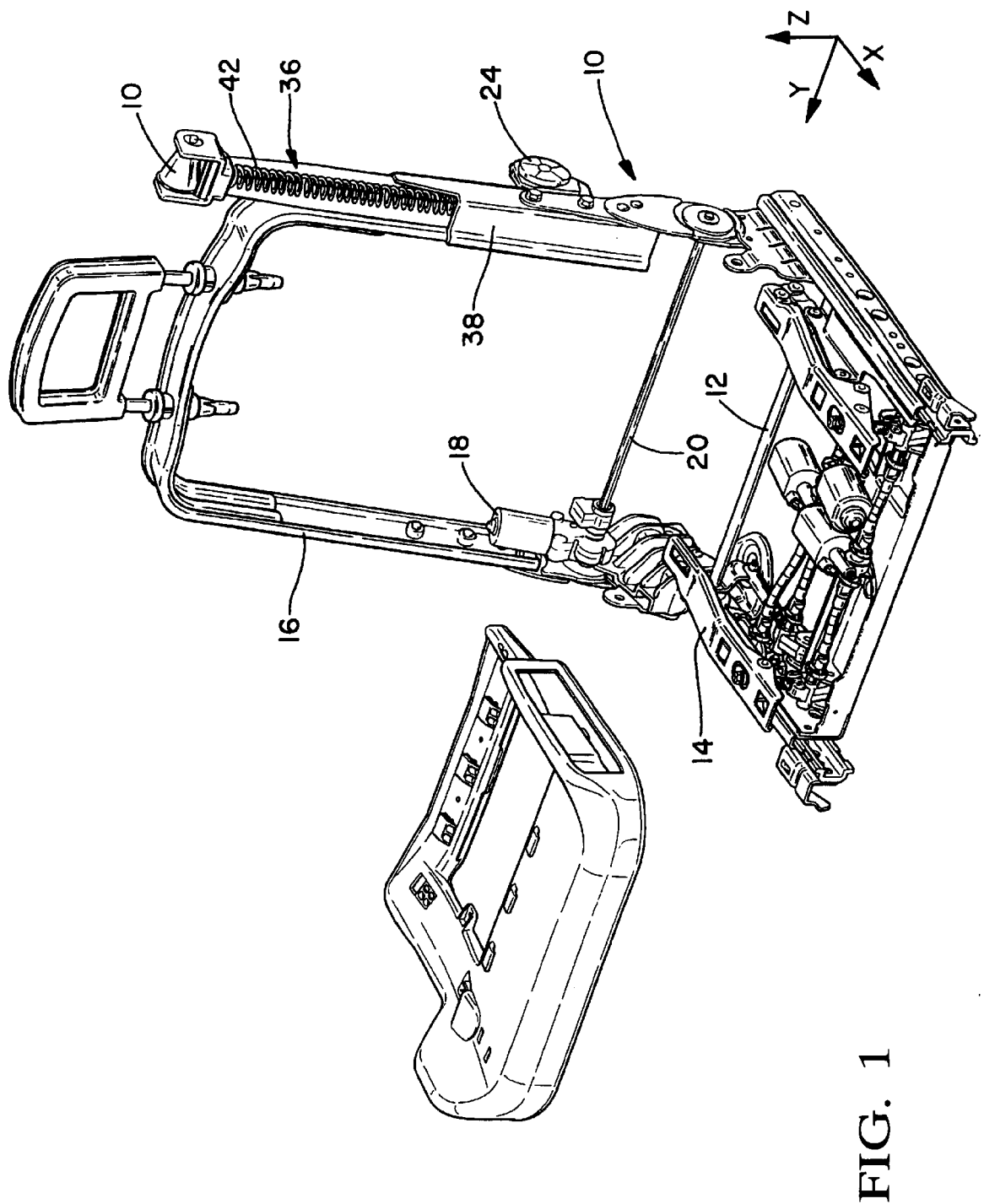
FIG. 1 is a perspective view of a seat frame incorporating the invention, shown belt attached.
Figure 2:
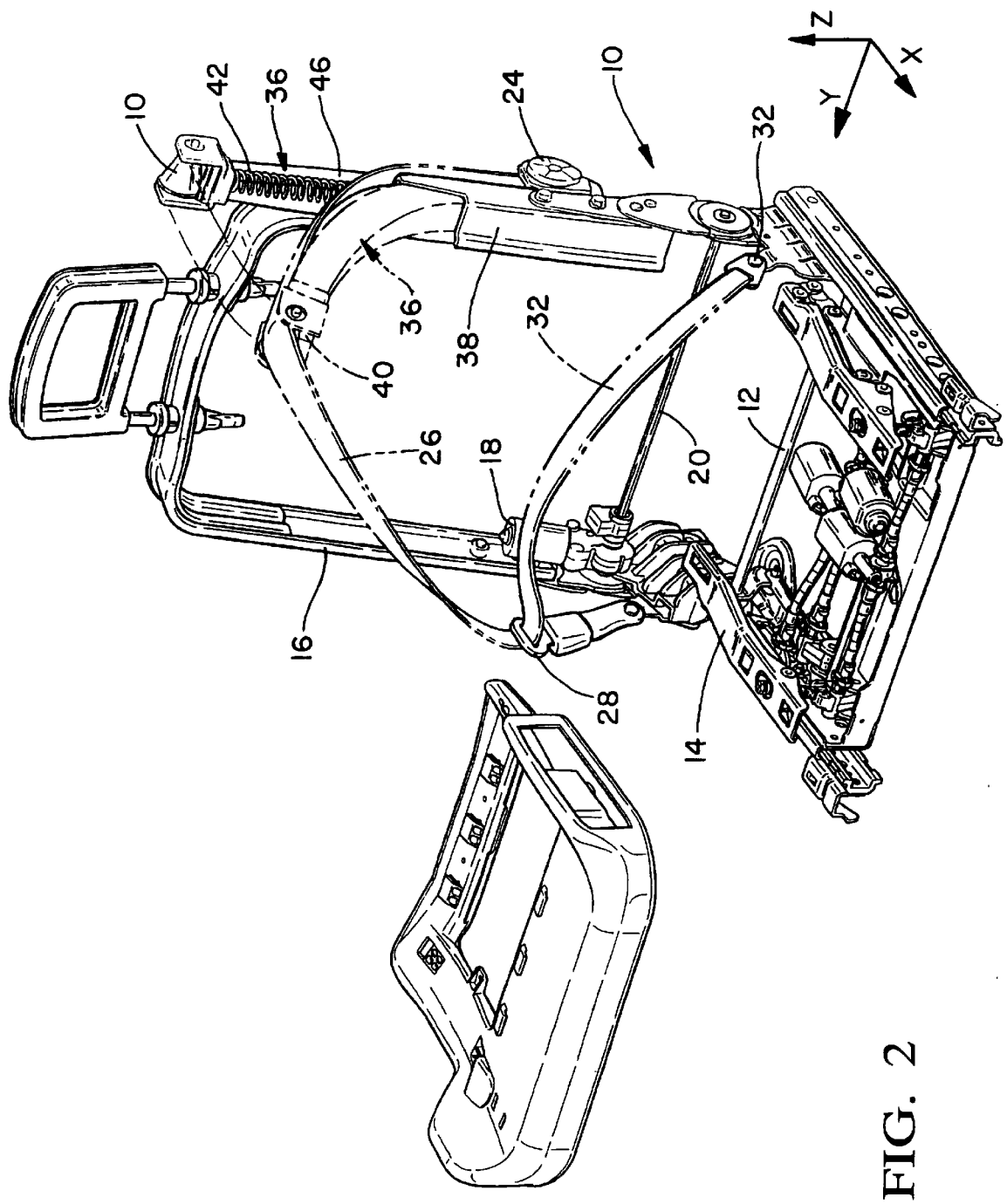
FIG. 2 is a perspective view of the seat frame showing the belt attached, and showing the tower in an upright, unflexed position and in a bent over, flexed position.

Referring first to FIGS. 1 and 2, an automotive vehicle has a seat, indicated generally at 10, securely mounted to a vehicle body. A conventional seat adjuster mechanism for for-aft and elevation of the seat 10 would be incorporated, and is indicated generally at 12. The seat 10 comprises a lower frame 14, directly mounted to the vehicle body floor, and a seat back 16 that is pivoted relative to the lower frame 14 by a conventional recliner mechanism 18, rotating about a recliner pivot axis 20. A conventional reference frame shown in FIG. 2 with the X axis running horizontally fore and aft, along the length of the vehicle body, the Y axis running horizontally side to side, and the Z axis running vertically, up and down. It is also helpful to refer to the side of the seat 10 near the vehicle doors as being outboard, and the opposite side as inboard. Any force applied forwardly to the seat back 16 applies a moment about the recliner axis 20, shown by the arcuate arrow in FIG. 2.

Figure 4:
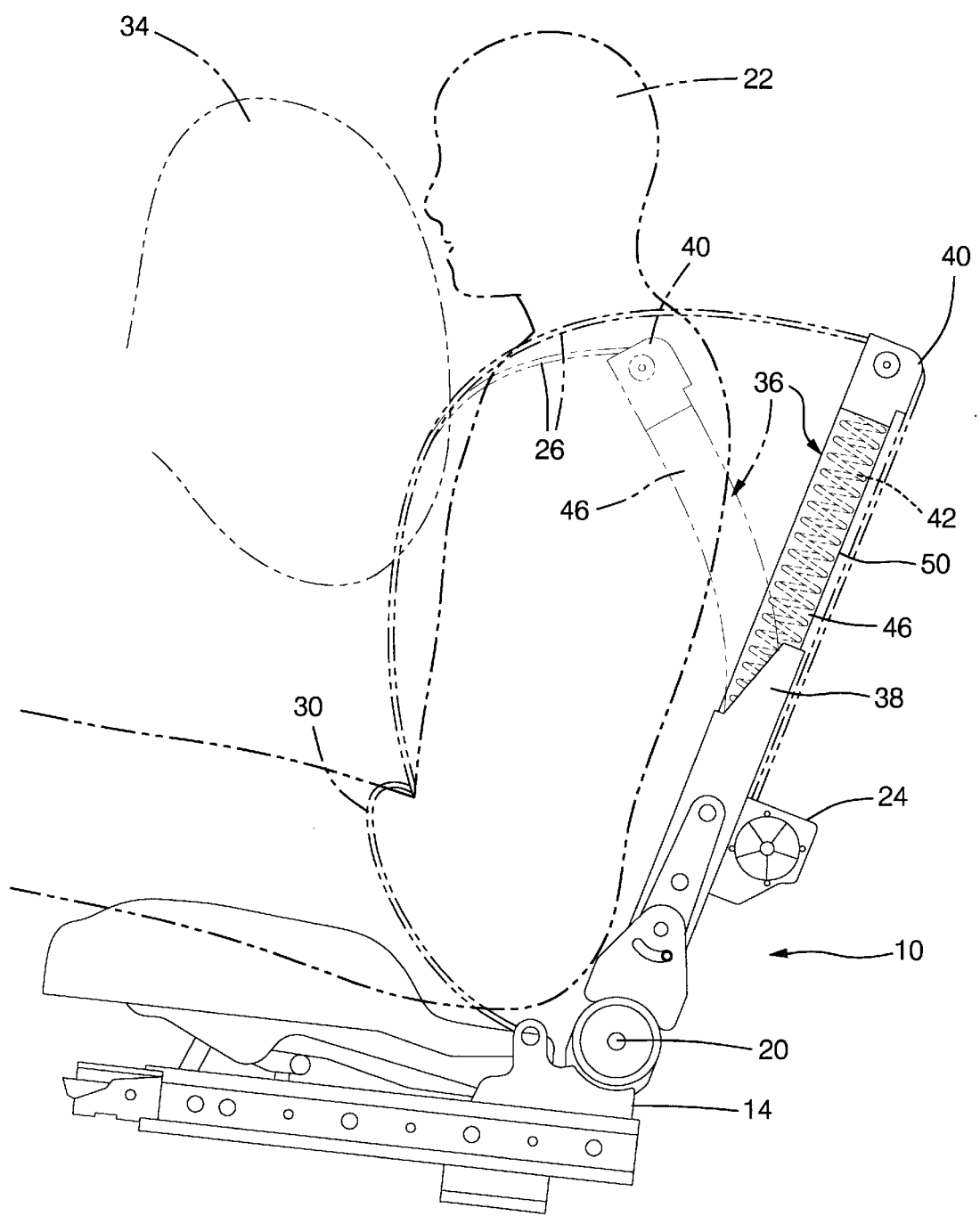
FIG. 4 is a side view of the seat with an occupant having bent forward in response to a vehicle deceleration, and showing the movement of belt and tower in response thereto.

Referring next to FIGS. 2 and 4, an occupant 22 of seat 10 normally sits back against seat back 16, which is typically reclined back somewhat from absolute vertical, as illustrated. The occupant 22 is restrained by a continuous length of slightly tensioned belt webbing that is spooled on and off a conventional locking retractor 24, which is rigidly fixed to the rear of seat back 16, on the outboard side. The belt webbing is divided up into the familiar three point configuration. Specifically, the belt webbing is divided up into a length referred to as shoulder belt 26, which runs from an upper attachment point located just behind and above the outboard shoulder of occupant 22, down across the chest and slidably through the loop of a buckle 28 detachably fixed to lower frame 14. Buckle 28 constitutes a lower attachment point of shoulder belt 26. From buckle 28, a length of the belt webbing constituting a lap belt 30 runs to a shackle 32 fixed to lower seat frame 14. In the absence of a deceleration or impact sufficient to lock up retractor 24, both the shoulder belt 26 and lap belt 30 can be freely pulled out and adjusted by the occupant 22, but stays taught against the occupant 22. In the event of a rapid and severe deceleration, such as that caused by a frontal impact, the retractor 24 locks up (allowing only a small payout of belt webbing) and all three belt webbing attachment points become effectively fixed. The occupant 22 moves relatively forwardly, but held down by the lap belt 30, and so tends to sit forward, bending from the waist. If the deployment threshold should be exceed, then a conventional air bag 34 inflates. The occupant 22 moves away from the seat back 16, to the extent allowed by the shoulder belt 26. If the shoulder belt 26 cannot relax more than just its inherent stretch would allow, the occupant 22 will not experience a large forward excursion in the X axis direction, but will instead be restrained by the shoulder belt 26. The shoulder belt 26 will consequently see a large and rapid increase in tension load as it restrains the forward bending of occupant 22. In addition, that increased belt tension load, acting on the seat back 16 through the upper attachment point of shoulder belt 26, will cause a large moment about the recliner axis 20 in the direction of the arrow of FIG. 2. In fact, plastic yield points are sometimes built into the brackets that attach the recliner mechanisms to the frame.

Current design practice in all belts to seat designs, with an "average" size occupant as designated by Federal testing standards, is to provide a seat back 16 and recliner mechanism 18 strong enough to withstand a 6.0 kN belt load and more than a 4000 Nm moment about the recliner axis This requires a strong and massive recliner mechanism 18 as well as a heavy seat back 16, the weight of which also adds to the inertial load on the recliner mechanism 18. To provide extra "stretch" and energy absorption in the shoulder belt 26, current practice incorporates a retractor mechanism with a built in belt load limiting feature. This pays out an extra length of belt under a restraining force, in response to increased belt tension load, but generally causes a permanent deformation of some internal mechanism in the retractor. This deformation is not easy to detect, and is generally not repeatable, requiring replacement of the retractor. Furthermore, the restrained pay out of extra belt length in response to increased belt tension load cannot distinguish between an increase in belt tension caused by a frontal impact or a side impact. In the latter case, even a limited lengthening of the belt would not be desirable.

Figure 5:
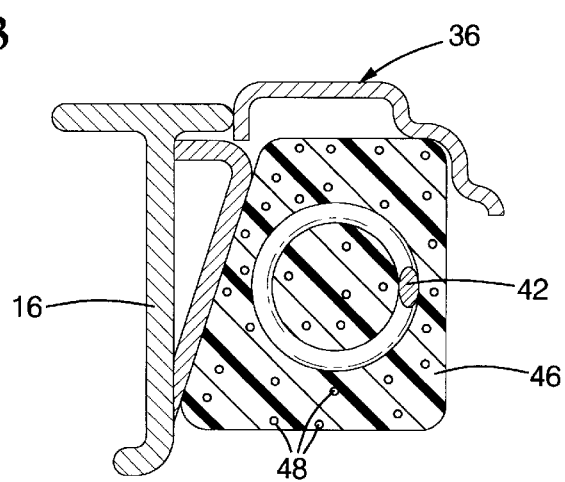
FIG. 5 is a cross section of the tower and seat frame sleeve containing the tower taken in a plane represented by the line 5—5 in FIG. 1.

The invention provides a mechanism that allows for controlled energy absorption in the shoulder belt 26, but with a conventional locking retractor mechanism 24. As best seen in FIGS. 1 and 5, an elongated, flexible, resilient tower, indicated generally at 36, extends along the outboard side of the seat back 16, generally vertically, or, at most with the same slight reclension from vertical that the seat back 16 has. The tower 36 makes a close fit within a sleeve 38 of seat back 16, and is constrained against bending at its lower end through a small portion of its lower length. Sleeve 38 is cut away on the front and inboard side so that the exposed upper length of tower 36, up to an uppermost, sliding belt guide 40, is unrestrained against bending forwardly and downwardly, in the X and Z direction. It is also capable of bending slightly to the side in the inboard Y direction, as will be described in more detail below. Tower 36 is constructed with a central, flexible center reinforcement, which provides most of its resilience and strength. As disclosed, the center reinforcement is a steel coil spring 42, although it could be a leaf spring or the like, of any resilient and flexible material. The lower end of the coil spring 42 could be provided with a metal fastening member that would be bolted or otherwise securely fixed inside of seat back sleeve 38, while the belt guide 40 would be fixed to the upper end of spring 42. Spring 42 thereby provides a continuous mechanical connection from the lower end of tower 36 to the top. The strength of spring 42 would be set so as to allow the tower 38 to begin to bend forward if a force in the lower range of approximately 2 kN is applied to it at the upper end belt guide 40, and to reach the physical limit of its forward bending, set out in more detail below, at an upper range of approximately 4 kN. Overmolded around the coil spring 42 is a surrounding damping layer 46 of polyurethane or other suitable polymeric material, which provides the outer shape of tower 36 and protects the coil spring 42. In addition, the outer layer 46 can provide another useful feature. A structure such as a spring 42 alone will provide basically the same resistance if it is bent over slowly or rapidly. However, when surrounded by a layer like 46 that can be given a strain rate sensitivity, the resistance to bending, and consequent energy absorption, can rise with the speed of bending imposed on the tower 36. For example, as disclosed, the molded polyurethane layer 46 has many small closed cell air bubble inclusions 48, which resist rapid compression more forcefully than slow compression. Other polymeric materials inherently provide strain rate sensitivity, even without inclusions. This differential force response to the speed of deformation can provide an advantage described more fully below.

Referring next to FIG. 2, the retractor 24 is fixed to the rear of seat back 16, substantially directly below the belt guide 40. It should be kept in mind that the retractor 24 is rigidly mounted to a part of seat back 16 that is not designed to bend or yield in any way with increased tension belt load, nor is any internal mechanism of retractor 24 intended to yield and absorb energy in response thereto. Retractor 24 simply locks fast onto the belt webbing in response to inertial loading, while allowing very little extra belt length to be paid out. The webbing runs from retractor 24, along the back of sleeve 38 and tower 36, and down over the tower belt guide 40 into the already defined shoulder belt 26. The length of webbing running between retractor 24 and the upper guide 40, which may conveniently be referred to as a reserve length 50, would, at first glance, appear to provide no obvious advantage, as compared to simply mounting the retractor 24 directly to the top of tower 36 in place of the belt guide 40. In the design shown in U.S. Pat. No. 5,468,053, described above, the advantage to mounting the retractor to the back of the seat frame was the ability to fix the retractor to a deformable beam in the seat frame. The upper point of attachment of the shoulder belt, on the other hand, was secured to an inherently inflexible part of the seat frame or, in other designs, secured to a part of the seat frame that is itself deliberately constrained against flexure. But here, the upper shoulder belt attachment point provided by belt guide 40 is made flexible and movable, which provides several unique advantages detailed next.

Figure 3:
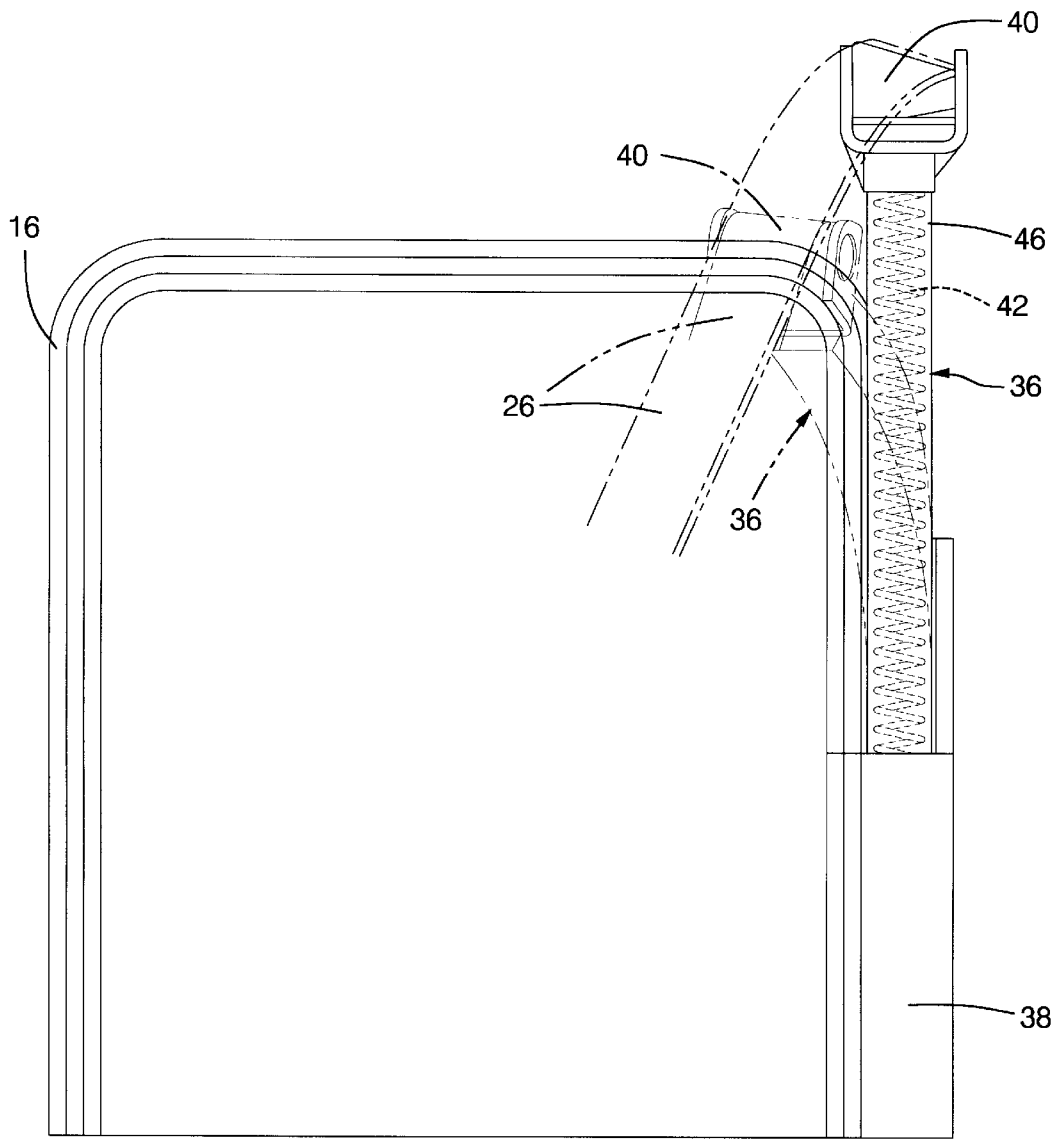
FIG. 3 is a front view of the tower both flexed and unflexed position.

Referring next to FIGS. 2 through 4, the response of tower 36 to a vehicle deceleration such as that caused by a frontal impact is illustrated. The retractor 24 locks very rapidly on the belt webbing, so that only the small, typical belt length increment is paid out into the reserve length 50. The occupant 22 moves forward relative to the vehicle, bending at the waist until restrained by the shoulder belt 26. Because of the locking of the retractor 24, the tension load in shoulder belt 26, at least initially, goes up rapidly as the occupant 22 moves into it. Because of the orientation of shoulder belt 26, a downward, forward, and slightly inboard force is applied to the upper belt guide 40 and tower 36. However, the increase in belt load is self limiting in that it quickly rises high enough, into the lower end of the force range noted above, to bend the tower 36 over. Specifically, the tower 36 bends in three directions, forward along the X axis, downward along the Z axis, and inward along the Y axis. The limits of these three directions of bending are designed to be approximately 20 cm, 15 cm and 15 cm respectively, although the tower 36 will obviously bend less under less than maximum loading. As tower 36 bends over and down, several things occur. The tension load in the shoulder belt 26 is rapidly reduced, since the belt reserve length 50, laying against the back of the bent over tower 36, moves from a vertical to a more horizontal orientation, allowing more of the belt webbing to slide relatively over the belt guide 40. This relaxes the tension in the shoulder belt 26 just as effectively as if more belt webbing were being paid out of retractor 24, although it is not. At the same time, the upper attachment point of the shoulder belt 26, which is the tower upper guide 40, moves physically forward with the occupant 22, which would provide a relaxing of tension in the shoulder belt 26 even if it were fixed to the belt guide 40. An almost doubled effective "stretch" of the shoulder belt 26 is achieved by the simultaneous effect of both actions, and a given displacement of the belt guide 40 downward provides nearly a two to one effective relaxation in the shoulder belt 26. An analogy would be the downward telescoping of a center tent pole. The taught tent fabric is relaxed on both sides of the pole, not just one, just as belt webbing is relaxed on both sides of the tower 36. The tower 36 does not just telescope downwardly along its length, however. Nor does it bend over loosely, of course, but absorbs and stores energy which would otherwise have to be absorbed by the very limited inherent stretch of the material of the belt webbing, or by an energy absorbing retractor.

The forward and downward motion of the belt guide 40, as opposed to simple telescoping collapse, provides other benefits in addition to reduced belt load. Since less force is applied to the seat back 16 at the belt guide 40, and since that point of application moves substantially closer to the recliner axis 20 as well, the resultant moment about axis 20 is reduced on both counts. Specifically, the moment can be reduced to 1400–1800 Nm, a very significant reduction in the 4250 Nm moment noted above. Deformation of the recliner mechanism 18, or of the brackets to which it is attached, is rendered less likely, and the seat back 16 is prevented from rotating forward out of it's original orientation. The occupant 22 is lain forwardly, downwardly, and slightly inboard by the motion of the tower 36 and shoulder belt 26, a favorable orientation for entry into the air bag 34. When the limits of forward bending by tower 26 is reached, it and the occupant 22 rebound, and the tower 36 returns to its original position. Overmolded layer 46 would dampen out the force and velocity of the rebound.

As noted above, the overmolded layer 46 can provide another advantage beyond rebound dampening. Frontal impact severity can vary, which increases both the rate of occupant deceleration relative to the tower 36 and the speed with which the tower 36 is deformed and bent over. As an example, a typical 35 mph frontal test crash into a fixed barrier such as that described above may impart a speed to the belt guide 40 of approximately 5 mm/millisecond. A more severe crash would impose a more rapid rate of deformation of tower 36, which would be more forcefully resisted by the tower 36, because of the strain rate sensitivity of the layer 46. An analogy would be the stiffer reaction of a vehicle shock absorber to wheel impact at higher speeds. This would translate to a higher tension load in the shoulder belt 26 than with lower speed frontal impacts, of course, but this is a desirable result, since a higher force applied through an equivalent displacement of tower 36 will also absorb more energy.

Other advantages beyond the lowering of belt tension load and reduction in moment about the recliner axis 20 are achieved by the disclosed design. As best seen in FIG. 4, there is a self positioning aspect to the motion of the belt guide 40, which keeps the belt guide 40 located just behind and above the outboard shoulder of the occupant 22, in spite of the forward bending of the occupant 22. The reserve belt length 50 moves lower, along with the shoulder belt 26, which stays "hooked" over the outboard shoulder of the occupant 22, a better orientation for occupant restraint. A typical load limiting retractor would not provide this advantage, since the upper attachment point of the shoulder belt 26 would not move. Furthermore, a typical load limiting belt retractor, reacting as it does simply to an increase in belt tension, would pay out belt webbing even in the event of side impacts. It could not distinguish, in effect, between frontal and side impact. The tower 36 of the invention, on the other hand, is designed to yield substantially only to forces imposed by the deceleration associated with frontal impacts, and would not stretch along its length or bend easily in other directions than that shown.

A tower like 36 could be applied to any seat, and on either or both sides thereof, though the outboard side is where the upper attachment point of a three point belt is typically found. A variety of composite structures could be used for the tower 36, in order to provide resilient flexibility combined with damping and/or strain rate sensitivity. Different cross sectional shapes could be used to cause the tower to favor bending to a selected side as it bent forwardly and down. Therefore, it will be understood that it is not intended to limit the invention to just the embodiment disclosed.

We claim:

1. A vehicle seat (10) having a lower seat frame (14) and a seat back (16) pivoted thereto about an axis (20), and a shoulder belt (26) for restraining a seat occupant (22) in the event of rapid deceleration relative to a vehicle with an upper attachment point (40) integral to said seat back (16) and adapted to be located behind and above a shoulder of said occupant (22) and a lower attachment point (28) diagonally opposed to said upper attachment point (40) and integral to said lower seat frame (14), characterized in that said vehicle seat (10) further comprises, a resilient, flexible elongated tower (36) having a sliding belt guide (40) at an upper end comprising said upper attachment point, said tower (36) being secured to said seat back so as to have substantially the same orientation as said seat back (16) in an unflexed condition, but capable of bending with said belt guide (40) down and forwardly relative to said seat back and closer to said seat back pivot axis (20) when a forward and downward force is applied to said belt guide (40), and, an inertially locking belt retractor (24) rigidly fixed to said seat (10) below said belt guide (40), said retractor (24) providing a reserve length of belt (50) that extends up along a back of said tower (36) and over said belt guide (40) and continuously into said shoulder belt (26), whereby, in the event of rapid vehicle deceleration, said belt retractor (24) locks to said belt reserve length (50) as said occupant (22) is thrown relatively forward into said shoulder belt (26), thereby rapidly increasing tension in said shoulder belt (26) and applying a forward and downward bending force to said upper belt guide (40) and tower (36), in response to which said tower (36) bends over and downwardly, allowing said belt reserve length (50) to move more horizontally along with said bending tower (36) as said upper guide (40) and shoulder belt (26) move forwardly with said occupant, said simultaneous belt reserve length (50) and shoulder belt (26) motions combining to reduce the resulting tension load in said shoulder belt (26) and the moment applied to said seat back (16) about said pivot axis (20).

2. A vehicle seat (10) according to claim 1, further characterized in that said tower (36) is comprised of a central, elongated resilient member (42) covered with an overmolded damping layer (46).

3. A vehicle seat (10) according to claim 1, further characterized in that said overmolded damping layer (46) is an elastomeric material providing strain rate sensitivity.

4. A vehicle seat (10) according to claim 1 further characterized in that said tower (36) makes a closed fit within a sleeve (38) on one side of said seat back (16).

* * * * *